United States Patent Office 3,180,748
Patented Apr. 27, 1965

3,180,748
HIGH-TEMPERATURE WELL CEMENT
Carl R. Holmgren and William G. Bearden, Tulsa, Okla., assignors to Pan American Petroleum Corporation, Tulsa, Okla., a corporation of Delaware
No Drawing. Filed Nov. 2, 1961, Ser. No. 149,535
8 Claims. (Cl. 106—104)

The present invention relates to novel cementing compositions. More particularly, it is concerned with a new combination of materials useful in forming a cement which retains its strength when subjected to temperatures of the order of 1500° to 2000° F. over prolonged periods of time.

The compositions of our invention are particularly useful in the completion of underground combustion wells where it is desired to case the wells through the formation or formations in which combustion is to be conducted. Basically, the well cementing compositions of our invention consist essentially of aluminum, calcium and iron oxides with smaller percentages of silicon and magnesium oxides to which is added a material such as ground fire clay brick or silica flour, and a set retarder.

Interest in high-temperature cements of the type contemplated by our invention results principally from activity in recent years directed to the recovery of oil from primary depleted oil reservoirs or from tar sand deposits by underground combustion. Cements normally used in the completion of oil wells are not satisfactory for combustion wells because the high temperatures generated in carrying out the process result in severe cracking and weakening thereof. For instance, ordinary Portland cement, while initially showing adequate strength, becomes very brittle and shrinks about 6 percent in all dimensions when fired. A material made of Portland cement and volcanic ash, when subjected to a temperature of about 1650° F., does not possess sufficient strength to be used as an oil well cement. It is true that prior to our invention special cements were provided for use in wells encountering maximum formation temperatures of 300° to 400° F. However, the requirements for cement to be used in combustion wells are much more severe. For example, cements used in such wells should be capable of withstanding temperatures of 1500° to 2000° F., after being placed in the well at relatively low temperature, i.e., the formation temperature which may be typically 40° to 75° F. To be placed properly, the cement slurry should remain in a fluid or pumpable condition for a period of time long enough for it to reach the zone to be cemented. This property is referred to as thickening time or pumpability time. Also, the cement should develop adequate strength at temperatures of 40° to 75° F. in 24 hours.

Accordingly, it is an object of our invention to provide a cementing material having the properties of an ordinary oil well cement, but possessing, in addition, the ability to withstand temperatures up to about 2000° F. for extended periods of time. It is also an object of our invention to furnish a material stable at the aforesaid high temperatures and which is capable of being cast into a permeable well liner to serve as a means of sand control in either ordinary producing or combustion wells.

In preparing the cementing material of our invention, we employ a high-alumina cement, an aggregate such as silica flour or ground fire clay brick frequently referred to as "grog," and a small amount, usually between 0.1 and about 1 percent, based on the weight of the solids present, of a set retarder. Other refractory aggregates such as ilmenite, mullite, kyanite, silicon carbide, alumina (fused), aluminum silicate and chrome ore, may be used in place of the silica flour or fire clay. In all instances, the aggregate material should be ground to a particle size at least as small as −20 mesh, and the silica flour is preferably employed in a particle size no larger than about −100 mesh. In this connection, the expression, "refractory aggregate," or "aggregate," as used in the present description and claims, is intended to be interpreted as a generic term for the specific aggregates listed above. Otherwise expressed, any product which carries ASTM Designation C27 for high-density fire clay brick or which has a pyrometric cone equivalent not lower than cone No. 31-32 or exhibits no more than 1.5 percent deformation in the 2460° F. (1350° C.) load test is satisfactory.

The set retarders employed may be any of several materials such as boric acid, an alkali metal or alkaline earth metal phosphate such as, for example, $NaH_2PO_4$, and calcium lignin sulfonate. In the case of the common refractory aggregates, we have found that boric acid performs more effectively, whereas with the formula employing silica flour, the phosphate-type retarder function best.

While the composition of the high-alumina cement may vary to some extent, it should generally contain (on a dry basis) 35 to 40 percent $Al_2O_3$, 30 to 35 percent $CaO$, 10 to 15 percent $Fe_2O_3$, and a combined percentage of silicon and magnesium oxides of from 5 to 10 percent. The expression, "high-alumina cement," therefore, as used in the present claims is to be construed as referring to cement mixes of the composition noted immediately above.

The high-alumina cement and aggregate are mixed in weight ratios of from about 1:¼ to 1:3, and preferably from 1:½ to 1:1. The set retarders are employed preferably in a concentration of from about .2 to about .8 percent, typically less than about .4 percent, based on the weight of the cement. In using the retarders, with the exception of calcium lignin sulfonate, they are preferably dissolved in water and the resulting solution added to the dry mixture of cement and aggregate. The lignin derivative, being insoluble in water, can be blended dry with the cement.

The favorable characteristics of the high-temperature cements of our invention are compared to certain prior art compositions in the table below. In the tests performed giving the results listed, standard API procedures were used. In the tests showing the effect of heat, the samples, after 51 hours, were allowed to cool in the oven to room temperature and were tested 18 hours after the oven was turned off. A number of the cementing materials were subjected to firing periods of 246 hours. In all cases, the percent of the set retarder is based upon the weight of the cement, and percent water is based upon the weight of the dry mixture of cement and aggregate. Prior to firing, unless otherwise indicated, all samples were cured at 80° F. at atmospheric pressure, under water. It will be noted that the strength characteristics are reported in the table in terms of compressive strength. Actually, tensile strength only was determined. However, since it is common practice to consider the tensile strength values as being one-tenth of the compressive strength and since this characteristic (strength) is ordinarily reported in terms of compressive strength, a better comparison with prior art compositions can be made.

Table

| Test No. | Composition | Percent water | Compressive strength, p.s.i., before firing [2] | | | Compressive strength, p.s.i., 72 hrs. cure+ Firing [1] for— | | | Pumpability time to 100 poises, hr.: min. | Remarks |
|---|---|---|---|---|---|---|---|---|---|---|
| | | | 24 hr. | 48 hr. | 72 hr. | 24 hr. | 72 hr. | 246 hr. | | |
| 1 | Atlas Portland cement | 46 | | | 3,450 | | 880 | | | Brittle, 6% shrinkage, all dimensions. |
| 2 | Portland cement+8% bentonite | 76 | | | 1,580 | | | | | Shattered upon cooling. |
| 3 | Universal Atlas Lumnite cement (high-alumina cement). | 40 | 3,750 | 4,080 | 3,280 | | 1,070 | 1,050 | 0:21 | Hard and firm. |
| 4 | High-alumina cement, 1 part and 1 part −20 mesh fire clay brick. | 30 | 2,740 | 2,920 | 3,030 | 905 | 840 | | 0:10 | |
| 5 | Composition of Test No. 4 plus 0.2% boric acid. | 30 | 3,210 | | | 1,425 | | | 0:50 | |
| 6 | Composition of Test No. 4 plus 0.3% boric acid. | 30 | [2] 3,510 | [2] 3,970 | [2] 5,560 | 1,980 | 3,030 | | 1:58 | |
| 7 | Composition of Test No. 4 plus 0.35% boric acid. | 30 | [2] 3,910 | [2] 3,920 | [2] 4,720 | 2,150 | 2,770 | | 2:53 | |
| 8 | Lumnite cement, 1 part and 1 part −325 mesh silica flour. | 40 | 1,360 | 1,210 | 1,690 | 1,285 | 1,950 | | 0:28 | |
| 9 | Composition of Test No. 8 plus 0.2% sodium hydrogen phosphate. | 40 | [2] 1,660 | | | 1,770 | | | 1:05 | |
| 10 | Composition of Test No. 8 plus 0.6% sodium hydrogen phosphate. | 40 | [2] 2,130 | [2] 1,800 | 1,990 | 1,930 | 1,930 | | 2:10 | Average permeability before firing, 8.45 md.; average permeability after firing 66.2 md. |
| 11 | Composition of Test No. 8 plus 0.8% sodium hydrogen phosphate. | 40 | [2] 1,730 | [2] 1,670 | 1,410 | 1,660 | 1,680 | | 3:25 | |
| 12 | Composition of Test No. 3 plus 0.35% calcium lignin sulfonate. | 40 | zero | 1,060 | 4,000 | | | 890 | 1:40 | |
| 13 | Composition of Test No. 3 plus 0.40% calcium lignin sulfonate. | 40 | zero | <5 | 4,380 | | | 1,160 | 1:48 | |
| 14 | 1 part high-alumina cement plus 1 part −30 mesh fire clay brick plus 0.40% calcium lignin sulfonate. | 30 | 990 | 2,680 | 3,160 | | | 1,380 | 1:12 | |
| 15 | Composition of Test No. 8 plus 0.35% calcium lignin sulfonate. | 40 | 820 | 1,180 | 1,420 | | | 1,550 | 2:53 | |

[1] Firing temperature 1,650° F.
[2] Cured at 95° F., 600 p.s.i.g., under water.

From an inspection of the data shown in the above table, it is seen that Portland cement compositions are of no value as a material for securing well casing to a formation in a temperature environment of the order of about 1600° F. The same is true of high-alumina cement by itself or with either a set retarder or an aggregate material. Thus, high-alumina cement itself has a poor pumpability time, i.e., it sets up too rapidly, for use as a well completion cement. When a set retarder is added, the pumpability time of such cement is satisfactory, but it does not set after 24 hours and, hence, is undesirable because of the excessive rig time required for a cement of this kind to develop the necessary strength. On the other hand, it is equally clear from the information appearing in the aforesaid table that well cements of the type claimed herein more than meet required pumpability time and compressive strength before and after firing. In this regard, minimum acceptable pumpability time for cements of this kind under the conditions tested is about one hour. Similarly, minimum acceptable compressive strength before and after firing is about 500 p.s.i.

The quantity of water used in preparing the novel compositions of our invention should be sufficient to give a pumpable slurry without appreciable settling of solids. Generally, the water employed may vary from about 25 to about 45 weight percent of the solids present. Usually, however, water concentrations of from about 30 to about 40 weight percent are preferred.

Thus, as seen from the foregoing tests, the present invention provides a cement composition with which it is possible to form well liners having a permeability between about 50 to 100 millidarcys, which well liners are well suited for use in sand control operations.

We claim:

1. A pumpable, high-temperature cementing composition consisting essentially of:
   an aqueous mixture of a high-alumina cement and silica flour,
   said alumina cement and silica flour being in a weight ratio ranging from about 1:¼ to about 1:3,
   and a set retarder selected from the group consisting of alkali and alkaline earth metal phosphates and calcium lignin sulfonate,
   said retarder being present in a concentration of from 0.1 to about 1 percent based on the weight of the solids present.

2. The high-temperature cement of claim 1 in which the high-alumina cement and silica flour are present in substantially equal amounts by weight and the set retarder is present in a concentration of from about 0.2 percent to about 0.8 percent by weight of the solids present.

3. The high-temperature cement of claim 1 in which the set retarder is calcium lignin sulfonate and wherein the alumina cement and silica flour are present in substantially equal amounts by weight.

4. The high-temperature cement of claim 1 in which the silica flour has a particle size no larger than about −100 mesh and the set retarder is calcium lignin sulfonate.

5. The high-temperature cement of claim 1 in which the silica flour has a particle size not larger than about −100 mesh and the set retarder is an alkali metal hydrogen phosphate in a concentration of from about 0.2 percent to about 0.8 percent by weight of the solids present.

6. The high-temperature cement of claim 5 in which the alkali metal hydrogen phosphate is $NaH_2PO_4$.

7. The high-temperature cement of claim 5 in which the high-alumina cement and silica flour are present in substantially equal amounts by weight.

8. As a new article of manufacture, a hollow, cylindrical sleeve having a permeability through the walls thereof of at least about 50 to 100 millidarcys, and fabricated out of the cement composition of claim 1.

(References on following page)

References Cited by the Examiner

UNITED STATES PATENTS

| | | | |
|---|---|---|---|
| 2,233,974 | 3/41 | Dunn | 106—89 |
| 2,684,720 | 7/54 | Lea | 166—31 |
| 2,845,360 | 7/58 | King et al. | 106—104 |
| 3,010,835 | 11/61 | Charles et al. | 106—104 |
| 3,071,481 | 1/63 | Beach et al. | 106—97 |
| 3,100,526 | 8/63 | Martin | 166—31 |
| 3,117,882 | 1/64 | Herschler et al. | 106—98 |

OTHER REFERENCES

Mudd: Industrial Minerals and Rocks, The American Institute of Mining and Metallurgical Engineers, New York, 1949, pages 893–926.

TOBIAS E. LEVOW, *Primary Examiner.*

JOSEPH REBOLD, *Examiner.*